Aug. 2, 1949.　　　G. C. WILHIDE　　　2,477,916
BENCH DRILL STAND
Filed Oct. 1, 1946　　　2 Sheets-Sheet 1
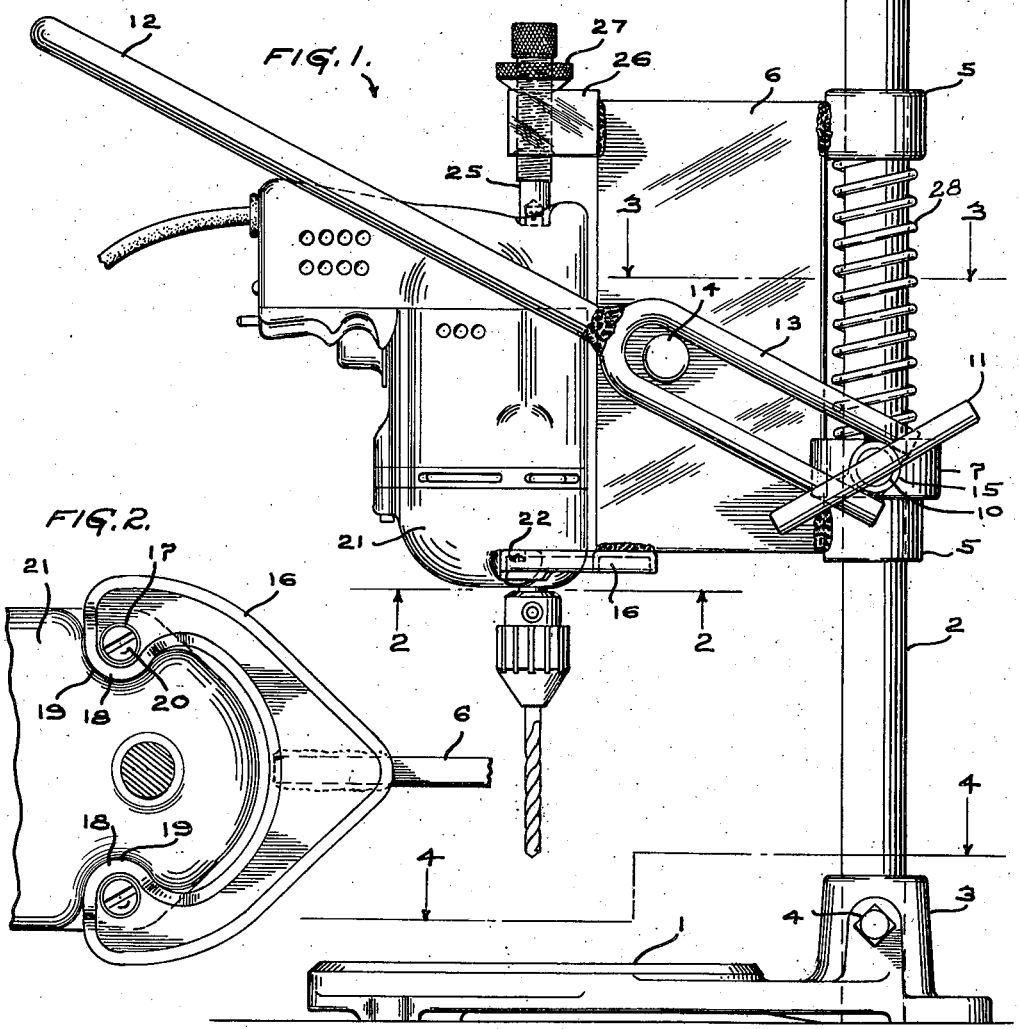
Inventor
Glenn C. Wilhide Aug. 2, 1949.　　　　G. C. WILHIDE　　　　2,477,916
BENCH DRILL STAND
Filed Oct. 1, 1946　　　　　　　　　　　2 Sheets-Sheet 2
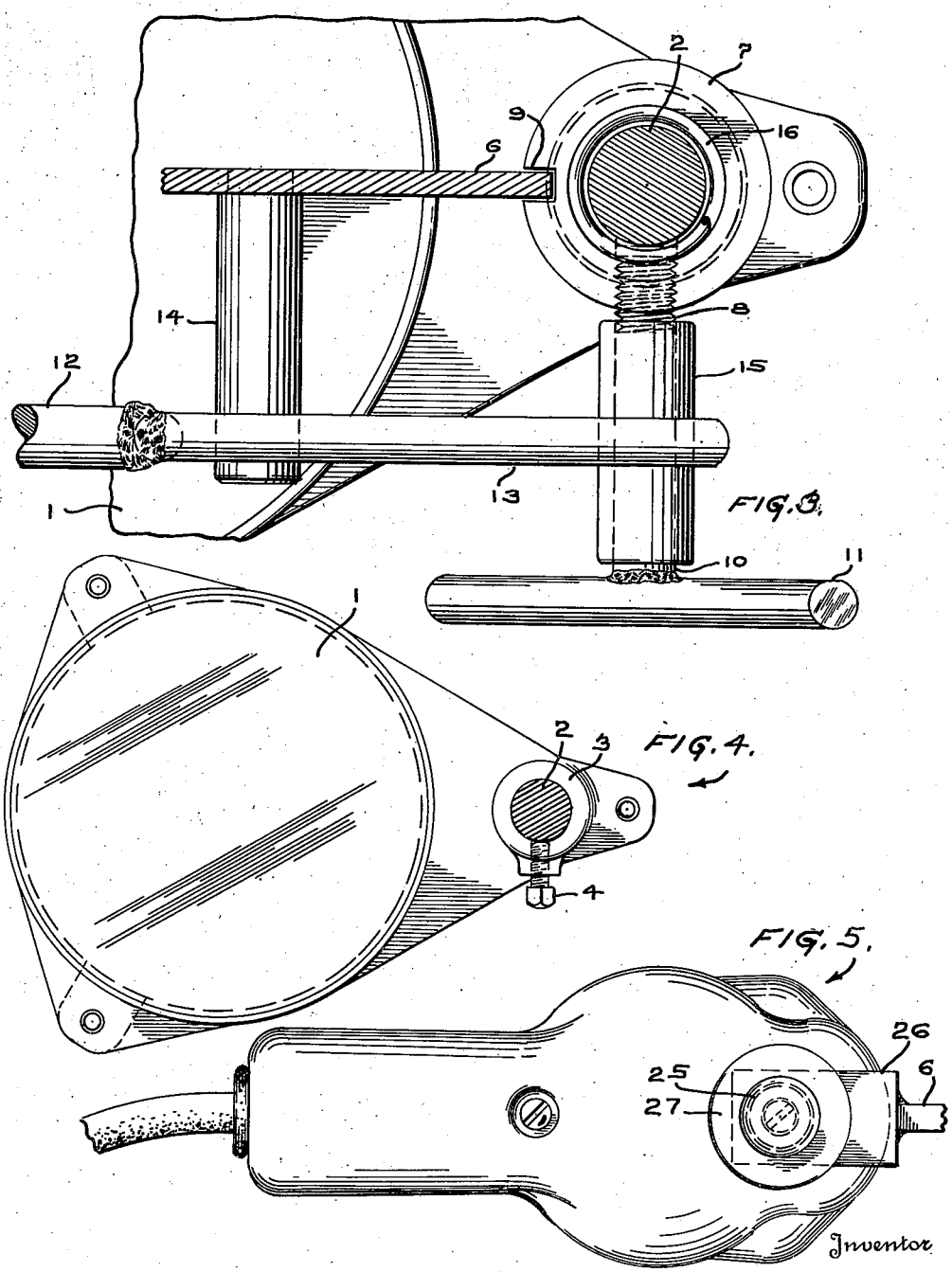
Inventor
Glenn C. Wilhide
By Thomas W. J. Clark
Attorney
Witness Patented Aug. 2, 1949

2,477,916

UNITED STATES PATENT OFFICE 2,477,916

BENCH DRILL STAND

Glenn C. Wilhide, Towson, Md., assignor to The Black and Decker Manufacturing Company, a corporation of Maryland Application October 1, 1946, Serial No. 700,474

6 Claims. (Cl. 77—19)

This invention relates to a bench drill stand for adapting a portable driven drill for use as a bench or press drill.

The stand not only serves as a support for carrying the weight, but also takes up the torque reaction of the tool and by adjustment, may cover a definite area with a minimum of effort on the part of the operator.

The stand of this invention rigidly clamps the drill and it may be instantaneously released by means of a single screw.

Such stands as heretofore have been made have been elaborate in construction and expensive and many of them have been adaptable to drills of various designs.

The stand of this invention is designed for a particular design of drill and is designed to be most economical of materials and to be easy to operate and accurate in alignment of the drill. In carrying out these objects, the parts are made of fabricated steel as far as possible.

Other objects and advantages of the invention will be apparent from the following description when taken in connection with the accompanying drawings forming a part hereof and in which:

Figure 1 is a side elevation of the stand of this invention showing a drill in place therein.

Figure 2 is a fragmentary inverted end view of the drill and stand substantially on line 2—2 of Figure 1.

Figure 3 is a fragmentary view looking downwardly substantially on line 3—3 of Figure 1.

Figure 4 is a plan view of the platform substantially on line 4—4 of Figure 1.

Figure 5 is a top plan view of the positioned drill showing the top support therefor.

Figure 6 is a fragmentary sectional view through the rear end of the drill and the top support therefor.

In the drawings similar numerals refer to similar parts throughout the several views.

The platform 1 has a post 2 in socket thereof held fast by set screw 4. The post is round and has thereon two collars 5 welded to plate 6 and an additional or adjustable stop collar 7 having set screw 8 therein to hold it in place. Collar 7 is notched or slotted at 9 to ride on the back edge of plate 6 to prevent the rotation of the plate when the set screw 8 is tightened. Set screw 8 has a long shank 10 with a T head 11 for turning it. A forked lever 12 with its fork 13 enclosing stud 14 on plate 6 has its lower end welded to sleeve 15 rotating on shank 10 of set screw 8. A spring 28 bears against the upper collar 5 and the adjustable collar 7 to hold the complete carriage up to support its weight and the weight of the drill.

Welded to the lower end of the plate 6 is a specially formed forked member or yoke 16 which has recesses 17 on its front face and the inner edges 18 of the yoke fit neatly indentations or sockets 19 in the nose of the drill casing. Screws 20 holding gear casing 21 of the drill on the main part of the casing fit snugly into the recesses 17 in the yoke 16. The indentations 19 are preferably flat as shown at 22 in their horizontal plane or at right angles to the drill axis. When the drill is placed downwardly onto this yoke 16 the drill is firmly held from downward movement and from rotary movement by the pincers-like fingers of the yoke 16 and the recesses in the yoke in which the screws 20 rest as well as the indentations 19 in the drill casing.

At the rear end or top of the drill, as shown, a further recess or socket 23 is provided and a screw 24 which holds the casing assembled projects upwardly centrally thereof. A rod or screw 25 threaded in block 26 welded to the upper end of the plate 6 with a hole drilled upwardly into the lower end of the screw fits neatly over the screw 24 and in socket 23. The screw 25 is provided with a lock nut 27 to hold it in locked position after once setting it firmly.

Screw 24 is preferably in the exact axis of the chuck of the drill. Screws 20 are substantially diametrically placed from the nose or chuck of the drill. The placement of the rear screw means that pressure downwardly on the drill is exerted in the direct line with the drill bit. The substantially diametrical location of the screws 20 and sockets 19 securely lock the drill from rotating and prevent any sidewise motion in raising the drill.

It will be apparent from the foregoing description that a most simple and economical stand has been provided and made nevertheless rigid and in which the drill may be placed by the manipulation of only the one screw and may be held fast thereby in a rigid vertical position in which it will not rotate, and that it may then be vertically adjusted on the post and readily manipulated in operation.

It will be apparent that many modifications may be made in the detailed construction of the various parts of the stands without departing from the invention.

What is claimed as new and is desired to be secured by Letters Patent is:

1. A bench drill stand for a portable electric drill comprising a post, a carriage on said post having means to hold a drill therein, said carriage having relative movement with said post parallel with the axis of the drill, said means comprising a screw aligned with and bearing on the drill casing in line with the axis of the drill when moving the drill to operative position and also two fixedly spaced drill casing supports bearing on the casing opposite to the bearing of the screw and in a direction parallel with the drill axis and spaced therefrom substantially diametrically of the drill axis when withdrawing the drill from operative position, the casing being held by compression between said screw and fixedly spaced supports and from rotation by the supports.

2. A bench drill stand for a portable electric drill comprising a post, a carriage on said post having means to hold a drill therein, said carriage having relative movement with said post parallel with the axis of the drill, said means comprising a screw aligned with and bearing on the drill casing when moving the drill to operative position and also two fixedly spaced drill casing supports bearing on the casing opposite to the bearing of the screw and parallel with the drill axis and spaced therefrom substantially diametrically of the drill axis when withdrawing the drill from operative position, the casing being held by compression between said screw and fixedly spaced supports and from rotation by the supports, said two fixedly spaced drill casing supports being in a plane transverse to said post.

3. A bench drill stand comprising an upright post, a bracket having collars thereon slidable on said post, a forked member with fixedly spaced prongs extending horizontally from said bracket at the lower end thereof fitting into substantially diametrical openings on the nose of a drill, a vertically extending set screw extending from the top of the bracket and engaging an opening axially of the drill chuck, said set screw having a lock nut to lock a drill vertically between the screw and forked member the casing being held by compression between said screw and member and from rotation by the member.

4. In combination, a portable power driven drill and a bench drill stand, the front of the drill casing having two supporting positions spaced from and extending substantially diametrically of the drill nose, and at the rear end, the casing having a supporting position axially of the drill chuck, the stand having a post and a carriage slidable thereon, a forked member with fixedly spaced prongs extending from one end of the carriage, the ends of the prongs fitting securely the supporting positions in the front end of the drill casing, an adjustable rod aligned with the drill and extending from the other end of the carriage and having means to hold the same in compression securely in the supporting position at the rear of the casing, the forked member and rod aligning the axis of the drill parallel to the direction of movement of the carriage on the post, the casing being held by compression between the said rod and member and from rotation by the member.

5. A bench drill stand for holding and securely clamping a portable power driven drill therein, the stand having a carriage, a post on which the carriage is mounted to slide, a forked bracket with fixedly spaced prongs extending at right angles to the direction of movement from the lower end of the carriage and having recesses in the prong ends, the prong ends fitting in drill casing recesses spaced from and extending substantially diametrically from the drill nose, and the fork recesses fitting over guides in the drill recesses, and a centering and clamping rod aligned with the direction of movement of and extending from the top of said carriage and fitting a centering means on the rear end of a drill casing, axially of the drill chuck whereby forward movement of the drill is compelled by force applied axially of the drill chuck and reverse movement is compelled by force applied substantially diametrically of the drill nose, the casing being held by compression between said rod and fork and from rotation by the fork.

6. A bench drill stand for holding and securely clamping a portable power driven drill therein, the stand having a carriage, a post on which the carriage is mounted to slide, means at the ends of the carriage to clamp a drill therebetween so that its axis is parallel with the direction of movement of the carriage, a stud extending from the carriage, a collar on said post and a long headed set screw passing through the collar to hold the collar securely in place on the post, a substantially straight lever having a fork at one end, the fork end of the lever being fulcrumed on said screw and the fork fitting over said stud to provide means to slide the carriage on the post.

GLENN C. WILHIDE.

REFERENCES CITED

The following references are of record in the file of this patent:

UNITED STATES PATENTS

| Number | Name | Date |
|---|---|---|
| 1,574,571 | Gray | Feb. 23, 1926 |
| 1,832,101 | Decker | Nov. 17, 1931 |
| 2,038,422 | Decker | Apr. 21, 1936 |